United States Patent
Lee et al.

(10) Patent No.: US 8,540,411 B2
(45) Date of Patent: Sep. 24, 2013

(54) BACKLIGHT UNIT AND DISPLAY DEVICE

(75) Inventors: Sang Hoon Lee, Seoul (KR); Young Bae Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 305 days.

(21) Appl. No.: 12/985,723

(22) Filed: Jan. 6, 2011

(65) Prior Publication Data
US 2011/0205754 A1 Aug. 25, 2011

(30) Foreign Application Priority Data

Jan. 7, 2010 (KR) ........................ 10-2010-0001458
Jan. 7, 2010 (KR) ........................ 10-2010-0001459

(51) Int. Cl.
*F21V 7/22* (2006.01)

(52) U.S. Cl.
USPC ........... 362/606; 362/612; 362/613; 362/632; 362/633; 362/634

(58) Field of Classification Search
USPC .................. 362/632, 633, 634, 606, 612, 613
See application file for complete search history.

(56) References Cited

U.S. PATENT DOCUMENTS

| | | | |
|---|---|---|---|
| 7,106,393 B2 | 9/2006 | Lee | 349/58 |
| 7,583,330 B2 | 9/2009 | Kwon et al. | 349/58 |
| 7,775,701 B2 | 8/2010 | Lee et al. | 362/633 |
| 7,959,344 B2 | 6/2011 | Shin | 362/633 |
| 2004/0114345 A1 | 6/2004 | Kim et al. | 362/31 |
| 2006/0062015 A1 | 3/2006 | Chung et al. | 362/600 |
| 2007/0002590 A1 | 1/2007 | Jang et al. | 362/633 |
| 2007/0133222 A1 | 6/2007 | Watanabe et al. | 362/561 |
| 2007/0211191 A1 | 9/2007 | Cho et al. | 349/58 |
| 2008/0049168 A1 | 2/2008 | Kubota | 349/65 |
| 2008/0111943 A1* | 5/2008 | Kim | 349/60 |
| 2008/0143918 A1 | 6/2008 | Kim | |
| 2008/0298001 A1 | 12/2008 | Choi | 361/681 |
| 2009/0073342 A1 | 3/2009 | Jung et al. | 349/60 |
| 2011/0228198 A1* | 9/2011 | Lee et al. | 349/62 |

FOREIGN PATENT DOCUMENTS

| | | |
|---|---|---|
| CN | 101038389 A | 9/2007 |
| EP | 1 835 330 A1 | 9/2007 |
| JP | 04-088392 A | 3/1992 |
| JP | 11-084351 A | 3/1999 |

(Continued)

OTHER PUBLICATIONS

European Search Report dated Apr. 5, 2011 issued in Application No. 11 15 0204.

(Continued)

*Primary Examiner* — Stephen F Husar
*Assistant Examiner* — James Cranson, Jr.
(74) *Attorney, Agent, or Firm* — KED & Associates, LLP

(57) ABSTRACT

Disclosed are a backlight unit and a display device. The backlight unit includes a bottom cover, a light emitting module including a plurality of light sources in the bottom cover, a light guide plate at one side of the light emitting module in the bottom cover, an optical sheet on the light guide plate, a support member coupled with the bottom cover, in which a part of the support member is placed on the optical sheet to make contact with a top surface of the optical sheet so that a bottom surface of the optical sheet contacts to the light guide plate, a top cover provided on the support member and coupled with the bottom cover. The light sources are interposed between the support member and the bottom cover.

17 Claims, 10 Drawing Sheets

(56) References Cited

FOREIGN PATENT DOCUMENTS

| | | |
|---|---|---|
| JP | 11-237630 A | 8/1999 |
| JP | 2003-222862 A | 8/2003 |
| JP | 2004-004809 A | 1/2004 |
| JP | 2004-193135 A | 7/2004 |
| JP | 2006-004931 A | 1/2006 |
| JP | 2006-054186 A | 2/2006 |
| JP | 2007-207506 A | 8/2007 |
| JP | 2008-112663 A | 5/2008 |
| JP | 2008-243558 A | 10/2008 |
| JP | 2009-049017 A | 3/2009 |
| JP | 2009-070681 A | 4/2009 |
| JP | 2010-113845 A | 5/2010 |
| KR | 10-0208026 B1 | 7/1999 |
| KR | 2002-0075587 | 10/2002 |
| KR | 10-2005-0064260 | 6/2005 |
| KR | 20-0401354 Y1 | 11/2005 |
| KR | 10-2006-0020315 A | 3/2006 |
| KR | 10-2006-0059476 | 6/2006 |
| KR | 10-0649106 B1 | 11/2006 |
| KR | 10-2007-0002552 A | 1/2007 |
| KR | 10-2007-0048516 A | 5/2007 |
| KR | 10-2007-0066218 A | 6/2007 |
| KR | 10-0757779 B1 | 9/2007 |
| KR | 10-2007-0117049 | 12/2007 |
| KR | 10-2008-0001759 | 1/2008 |
| KR | 10-2008-0025621 A | 3/2008 |
| KR | 10-2008-0029332 A | 4/2008 |
| KR | 10-2008-0054761 | 6/2008 |
| KR | 10-2008-0071407 A | 8/2008 |
| KR | 10-2008-0072210 | 8/2008 |
| KR | 10-0879868 B1 | 1/2009 |
| KR | 10-2009-0073586 A | 7/2009 |
| KR | 10-2009-0079568 A | 7/2009 |
| KR | 10-2009-0120097 | 11/2009 |
| WO | WO 2007-157355 A1 | 12/2009 |

OTHER PUBLICATIONS

Korean Office Action dated Mar. 11, 2011.
Korean Notice of Allowance dated May 27, 2011.
Korean Office Action dated Oct. 21, 2010.
Korean Office Action dated Feb. 17, 2011.
Chinese Office Action dated Aug. 13, 2012 issued in Application No. 201110005787.7.
Japanese Office Action dated Sep. 3, 2012 issued in Application No. 2011-000338.
Korean Office Action issued in KR Application No. 10-2010-0001458 dated Oct. 20, 2010.
Korean Office Action issued in KR Application No. 10-2010-0001459 dated Oct. 20, 2010.
Korean Office Action dated Feb. 18, 2011 issued in Application No. 10-2010-0001458.

* cited by examiner

BACKLIGHT UNIT AND DISPLAY DEVICE

The present application claims priority of Korean Patent Applications No. 10-2010-0001458 filed on Jan. 7, 2010 and No. 10-2010-0001459 filed on Jan. 7, 2010, which are hereby incorporated by reference in their entirety.

BACKGROUND

The embodiment relates to a backlight unit and a display device.

Among display devices, an LCD (Liquid Crystal Display) requires a backlight unit to supply light in order to display an image.

The backlight unit includes a light source to generate light and optical sheets provided on the optical path between the light source and the LCD. The LCD includes a display panel provided on the traveling path of light emitted from the backlight unit.

SUMMARY

The embodiment provides a backlight unit having a novel structure and a display device.

The embodiment provides a backlight unit easily assembled and a display device.

According to the embodiment, a backlight unit includes a bottom cover, a light emitting module including a plurality of light sources in the bottom cover, a light guide plate at one side of the light emitting module in the bottom cover, an optical sheet on the light guide plate, a support member coupled with the bottom cover, in which a part of the support member is placed on the optical sheet to make contact with a top surface of the optical sheet so that a bottom surface of the optical sheet contacts to the light guide plate, a top cover provided on the support member and coupled with the bottom cover. The light sources are interposed between the support member and the bottom cover.

According to the embodiment, a backlight unit includes a bottom cover, a light emitting module including a plurality of light sources in the bottom cover, a light guide plate at one side of the light emitting module in the bottom cover, an optical sheet on the light guide plate, a support member coupled with the bottom cover, in which a part of the support member is placed on the optical sheet to make contact with a top surface of the optical sheet so that a bottom surface of the optical sheet closely adheres to the light guide plate, a top cover provided on the support member and hooked and screwed with the bottom cover. The light sources are interposed between the support member and the bottom cover.

According to the embodiment, a backlight unit includes a bottom cover, a light emitting module including a plurality of light sources in the bottom cover, a light guide plate at one side of the light emitting module in the bottom cover, an optical sheet on the light guide plate, a support member hooked or screwed with the bottom cover, in which a part of the support member is placed on the optical sheet to make contact with a top surface of the optical sheet so that a bottom surface of the optical sheet contacts to the light guide plate, and a top cover provided on the support member and coupled with the bottom cover. The light sources are interposed between the support member and the bottom cover.

According to the embodiment, a backlight unit includes a bottom cover, a light emitting module including a plurality of light sources in the bottom cover, a light guide plate at one side of the light emitting module in the bottom cover, an optical sheet on the light guide plate, a support member press-fitted and screwed with the bottom cover, in which a part of the support member is placed on the optical sheet to make contact with a top surface of the optical sheet so that a bottom surface of the optical sheet contacts to the light guide plate, and a top cover provided on the support member and coupled with the bottom cover. The light sources are interposed between the support member and the bottom cover.

DETAILED DESCRIPTION OF THE EMBODIMENTS

Figure 1:
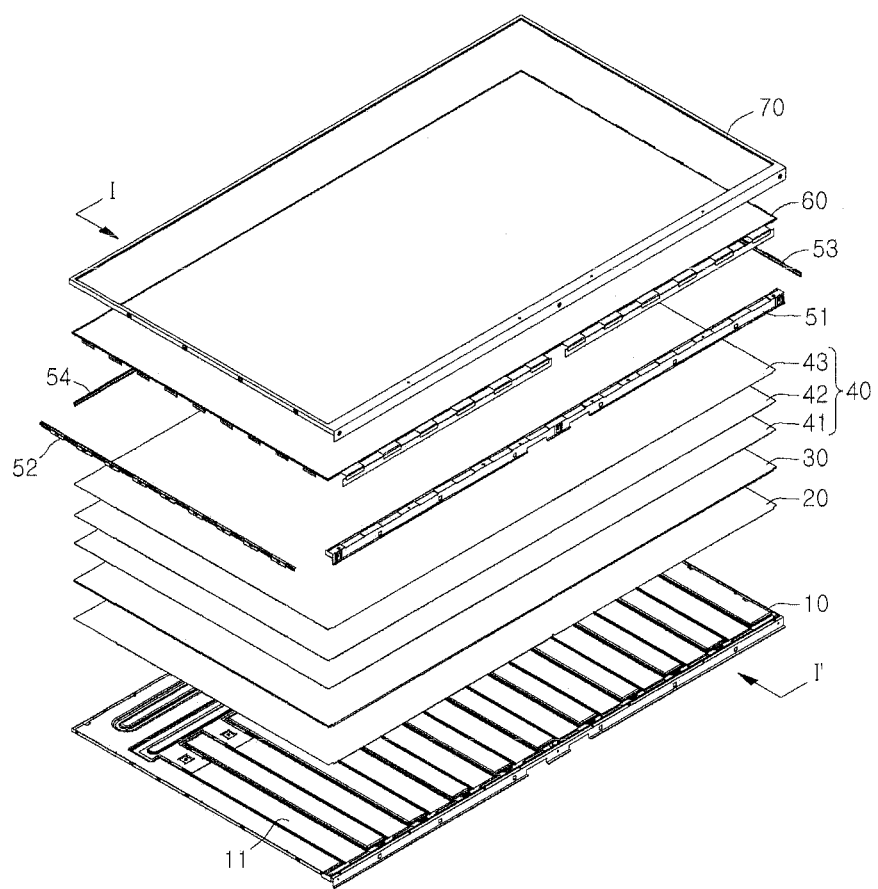
FIG. 1 is an exploded perspective view showing a display device according to the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a backlight unit and a display device according to embodiments will be described with reference to accompanying drawings.

The display device according to the embodiment includes a backlight unit and a display panel to display an image by receiving light from the backlight unit. Therefore, according to the embodiment, the display device will be described together with the backlight unit below.

The display device according to the embodiment may have a rectangular shape having two longer sides and two shorter sides. If the display device is attached to a wall or installed upright by using a stand structure, one longer side is disposed at a lower portion of the display device, and the other longer side is disposed at an upper portion of the display device. In addition, two shorter sides are disposed at left and right portions of the display device. According to the embodiment, for the purpose explanation, the longer side disposed at the lower portion will be referred to as a first longer side, and the other longer side disposed at the upper portion will be referred to as a second side. In addition, hereinafter, the shorter side disposed at the left portion will be referred to as a first shorter side, and the other shorter side disposed at the right portion will be referred to as a second sorter side. However, the present invention is not limited thereto.

In the display device according to the embodiment, at least one control interface of a remote control unit signal receiving part, a volume controller, a channel controller, and a screen controller may be provided at the first longer side.

Hereinafter, according to the embodiment, for the purpose of explanation, the arrangement direction of a top cover and the display panel will be designated as the direction of a front surface, and the arrangement direction of a bottom cover will be designated as the direction of a rear surface. However, the present invention may be not limited thereto.

Figure 2:
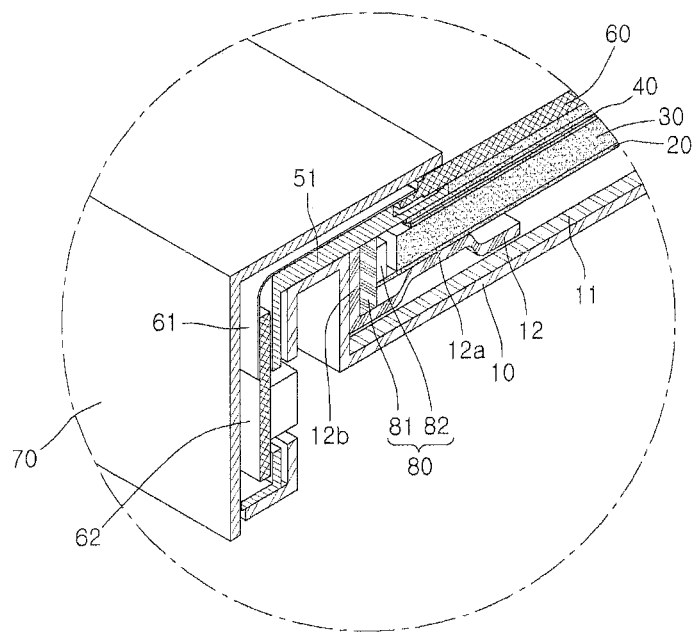
FIG. 2 is a sectional view taken along line I-I' of the display device of FIG. 1.
Figure 3:
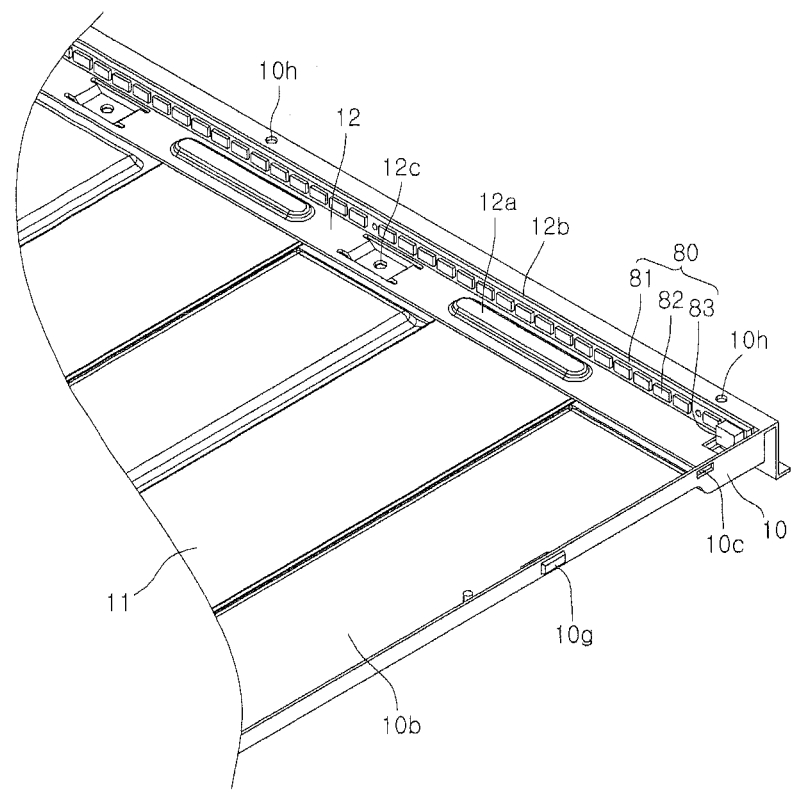
FIG. 3 is a view showing a light emitting module inside the bottom cover of the display device according to the embodiment.
Figure 4:
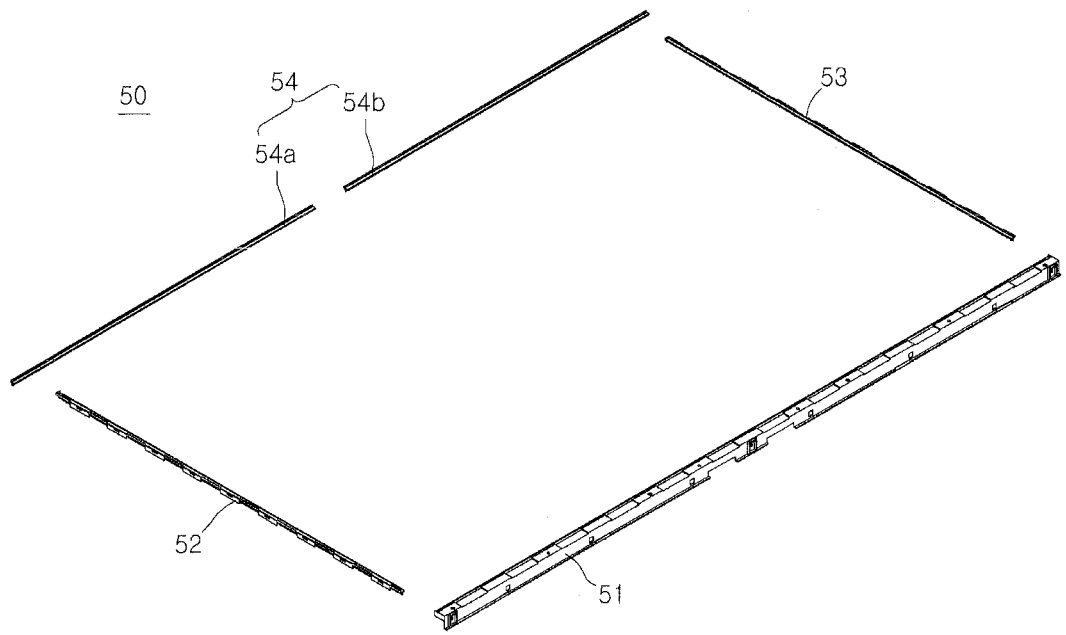
FIG. 4 is a view showing a support member in the display device according to the embodiment.

FIG. 1 is an exploded perspective view showing the display device according to the embodiment, and FIG. 2 is a sectional view taken along line I-I' of the display device of FIG. 1. FIG. 3 is a view showing a light emitting module inside the bottom cover of the display device according to the embodiment, and FIG. 4 is a view showing a support member in the display device according to the embodiment.

Referring to FIGS. 1 to 4, the display device according to the embodiment includes a bottom cover 10, a light emitting module 80 in the bottom cover 10, a reflective sheet 20 on the bottom cover 10, a light guide plate 30 on the reflective sheet 20, an optical sheet 40 on the light guide plate 30, a display panel 60 on the optical sheet 40, a top cover 70 on the display panel 60, and a support member 50 interposed between the bottom cover 10 and the top cover 70.

The bottom cover 10 has the shape of a rectangular plane having the first and second longer sides and the first and second shorter sides, and includes a bottom surface and four sidewalls vertically extending from the bottom surface. The bottom cover 10 receives the light emitting module 80, the reflective sheet 20, the light guide plate 30, and the optical sheet 40.

Figure 5:
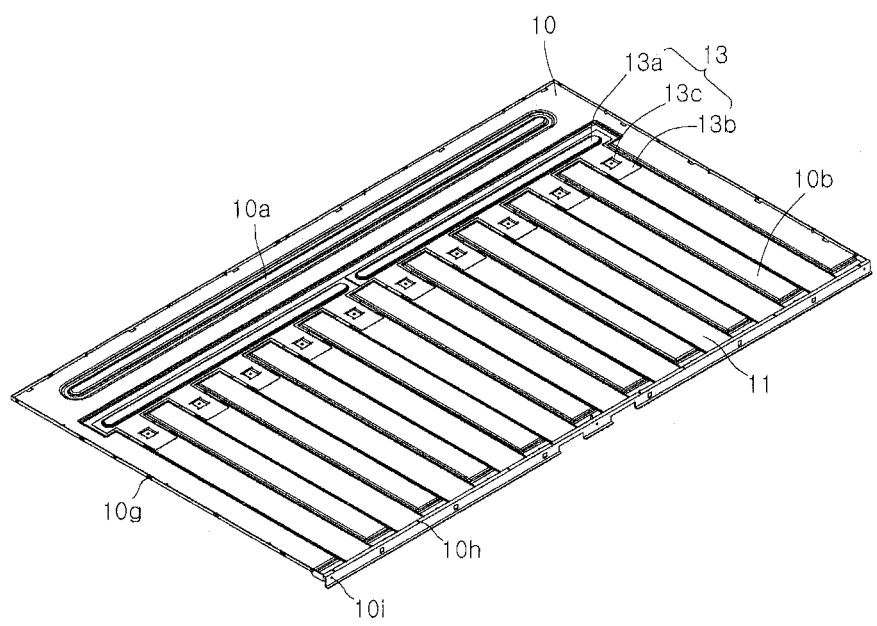
FIGS. 5 and 6 are plan and bottom views of the bottom cover according to the embodiment.
Figure 6:
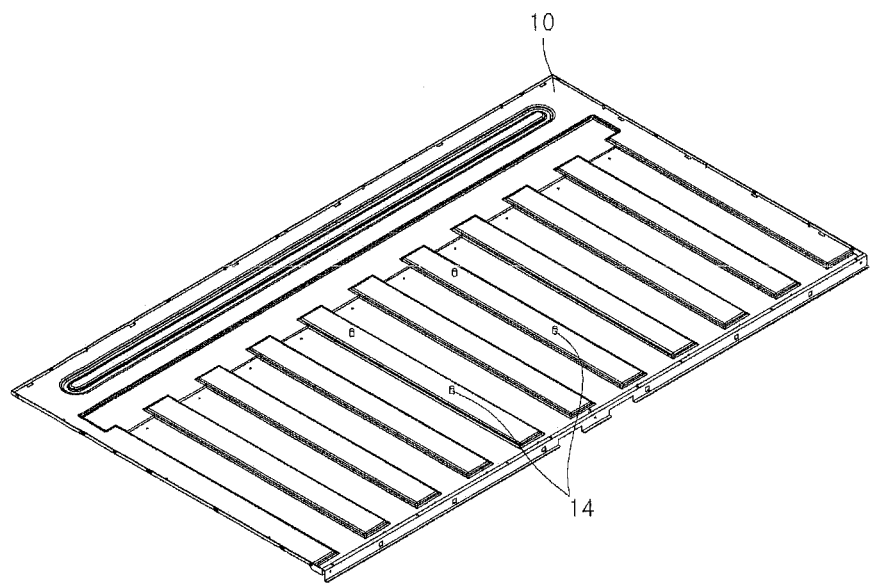
Figure 7:
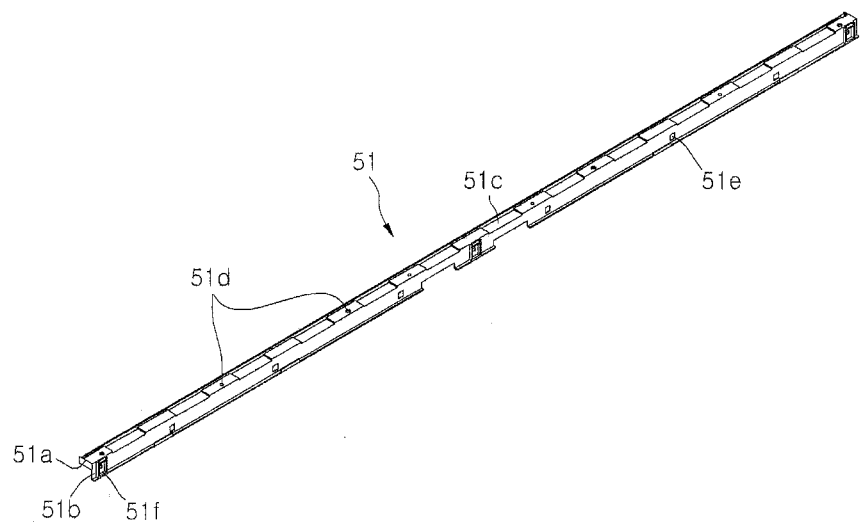
FIGS. 7 to 10 are views showing the structure of the support member in the display device according to the embodiment.
Figure 8:
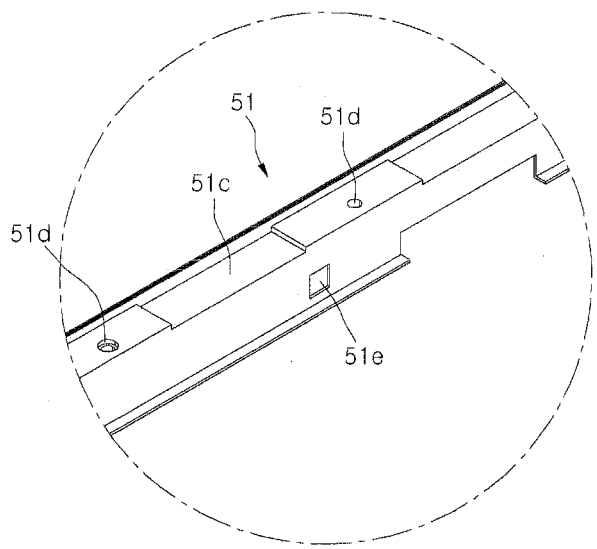
Figure 9:
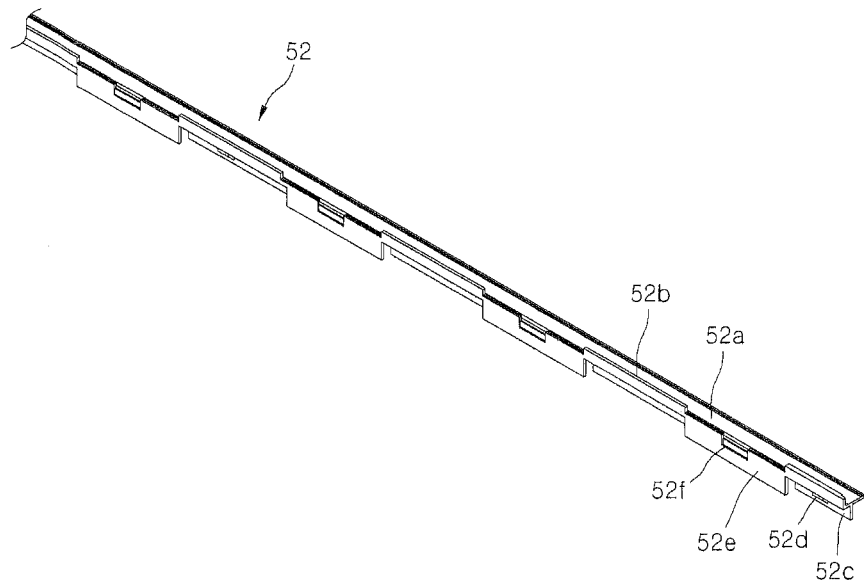
Figure 10:
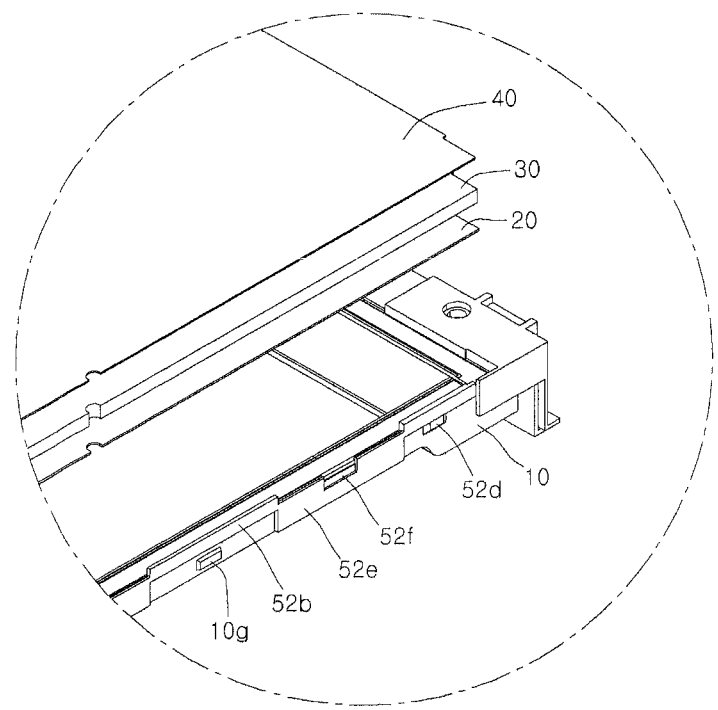

FIGS. 5 and 6 are plan and bottom views of the bottom cover 10 according to the embodiment.

Hereinafter, the bottom cover 10 will be described in more detail with reference to FIGS. 1 to 6. As shown in FIG. 5, the bottom cover 10 may include metallic material. In order to improve rigidity, the bottom cover 10 include at least one first convex part 10a extending in a first direction and at least one second convex part 10b extending in a second direction perpendicular to the first direction. The first and second convex parts 10a and 10b may be formed by pressing the bottom cover 10, and protrude from an adjacent part.

The first convex part 10a may extend in the first direction on the bottom cover 10, and the second convex part 10b may extend in the second direction parallel to the shorter side on the bottom cover 10 having a rectangular shape. The first and second convex parts 10a and 10b support the reflective sheet 20. The top surface of the first convex part 10a may be arranged in line with the top surface of the second convex part 10b such that the reflective sheet 20 may be supported in a flat state. In other words, the top surfaces of the first and second convex parts 10a and 10b may have the same height.

A first heat dissipation member 11 may be interposed between the second convex parts 10b. A plurality of first heat dissipation members 11 can be provided. For example, the first heat dissipation member 11 may have the form of a heat pipe.

Since the second convex part 10b is prepared in the form of a protrusion, inclined surfaces are formed in the vicinity of the first heat dissipation member 11 and the first convex part 10a. The inclined surface in the vicinity of the first heat dissipation member 11 may have an inclination angle less than that of the inclined surface in the vicinity of the first convex part 10a in order to facilitate installation of the first heat dissipation member 11.

A fixing member 13 is coupled with the bottom cover 10. The fixing member 13 is provided therein with a coupling hole 13c so that the fixing member 13 can be fixed on the bottom cover 10 through the coupling hole by a coupling member such as a screw. Accordingly, the first heating member 11 can be firmly fixed onto the bottom cover 10. The top surface of the fixing member 13 may be arranged in line with the top surfaces of the first and second convex parts 10a and 10b such that the reflective sheet 20 can be maintained in the flat state.

The fixing member 13 includes a body part 13a extending in the first direction and a branch part 13b extending in the second direction from the body part 13a. A plurality of branch parts 13b may be provided together with one body part 13a. At least a portion of the branch part 13b is provided on the first heat dissipation member 11, so that the first heat dissipation member 11 can be fixed onto the bottom cover 10 while contacting to the bottom cover 10.

As shown in FIG. 6, a plurality of studs 14 are formed on a rear surface of the bottom cover 10, so that a power supply or a printed circuit board can be fixed onto the rear surface of the bottom cover 10. The studs 14 are coupled with the power supply or the printed circuit board, so that the rigidity of the bottom cover 10 can be more enhanced.

The bottom cover 10 is provided in the first longer side thereof with coupling holes 10h and 10i such that the bottom cover 10 can be coupled with the first support member 51 and the top cover 70 by a coupling member such as a screw, and provided in the second longer sides and the first and second shorter sides thereof with a coupling protrusion 10g such that the bottom cover 10 can be hooked with the top cover 70.

Although not shown, an H beam can be coupled with the rear surface of the bottom cover 10 in order to complement the rigidity of the bottom cover 10.

Referring to FIGS. 2 and 3, a second heat dissipation member 12 is coupled in the vicinity of the first longer side of the bottom cover 10.

The second heat dissipation member 12 is provided therein with a coupling hole 12c such that the second heat dissipation member 12 may be fixed onto the bottom cover 10 through the coupling hole 12c by a coupling member such as a screw. The second heat dissipation member 12 is provided above a part of the first heat dissipation member 11 and cooperates with the fixing member 13 to allow the first heat dissipation member 11 to be fixed onto the bottom cover 10 while the first heat dissipation member 11 contacts to the bottom cover 10.

The second heat dissipation member 12 has a protrusion part 12a locally projecting, and the top surface of the protrusion part 12a may be arranged in line with the top surface of the fixing member 13 and the top surfaces of the first convex part 10a and the second convex part 10b.

The second heat dissipation member 12 makes contact with the first heat dissipation member 11 and transfers heat emitted from the light emitting module 80 to the first heat dissipation member 11 such that heat can be effectively dissipated.

The second heat dissipation member 12 has a support part 12b extending along the sidewall of the bottom cover 10, and the light emitting module 80 is mounted on the support part 12b of the second heat dissipation member 12.

The light emitting module 80 includes at least one light emitting device 82 and a light emitting module substrate 81 having a circuit pattern to supply power to the light emitting device 82 and supporting the light emitting device 82. The light emitting module 80 may further include a connector 83 to electrically connect the light emitting module substrate to an external power supply or an external printed circuit board. According to the embodiment, although the light emitting module 80 employs a light emitting diode as the light emitting device 82, the light emitting module 80 may include a lamp such as a CCFL or another light emitting device such as an OLED.

The light emitting device 82 is provided only in the vicinity of the first longer side or the second longer side of the display panel 60. According to the embodiment, the light emitting device 82 is provided in the vicinity of the first longer side of the display panel 60.

The number of light emitting devices 82 may vary according to the size of the display panel 60, that is, the inch of the display panel 60 in order to supply light having desirable brightness or uniform light. Preferably, the light emitting devices 82 are provided in number corresponding to about 2.5 times to 3.5 times the size of the display panel 60. If the number of the light emitting devices 82 is less than 2.5 times the size of the display panel 60, or greater than 3.5 times the size of the display panel 60, desirable brightness and uniform light cannot be supplied.

For example, if the display panel 60 has the size of about 47 inches, 118 to 164 light emitting devices 82 may be installed. According to the embodiment, the display panel 60 has the size of about 47 inches, and 138 light emitting devices 82 are installed.

The light guide plate 30 is mounted on the bottom cover 10 and the second heat dissipation member 12 such that light emitted from the light emitting device 82 is output in the form of surface light. The reflective sheet 20 is interposed between the light guide plate 30 and the bottom cover 10 to reflect light emitted from the light emitting device 82 toward the light guide plate 30, so that light efficiency can be improved. The reflective sheet 20 may not be formed. In detail, the reflective sheet 20 does not exist in the form of a separate sheet, but may be coated on the light guide plate 30 or the bottom cover 10 by using a material having high reflectance.

The optical sheet 40 is provided on the light guide plate 30. For example, the optical sheet 40 may include a first diffusion sheet 41, a prism sheet 42, and a second diffusion sheet 43. The optical sheet 40 may not be formed. In other words, only one diffusion sheet or only one prism sheet may be formed. The number of the type of the optical sheets 40 may vary depending on required brightness characteristics.

The display panel 60 is provided on the optical sheet 40. The display panel 60 may include a liquid crystal display panel.

Figure 11:
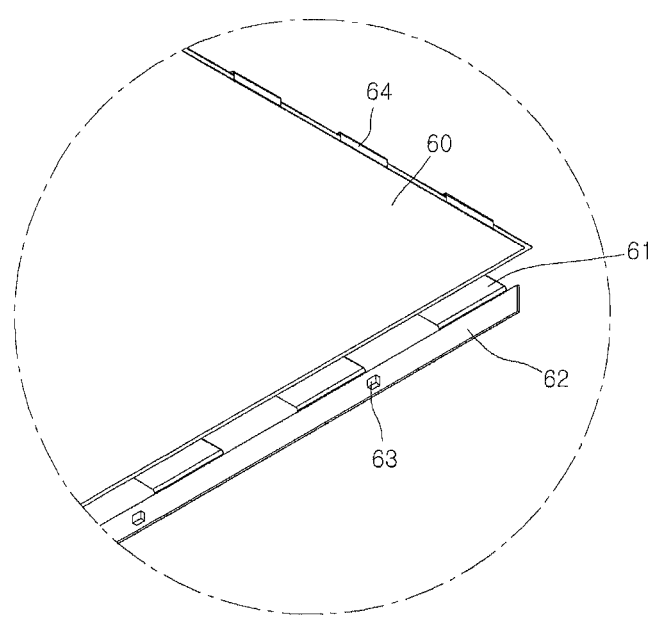
FIG. 11 is a view showing a display panel in the display device according to the embodiment.

FIGS. 7 to 10 are views showing the support member 50 of the display device according to the embodiment, and FIG. 11 is a view showing the display panel 60 of the display device according to the embodiment.

Referring to FIGS. 1 to 4, and FIGS. 7 to 10, the support member 50 includes first to fourth support members 51 to 54. The fourth support member 54 may include two separate support members 54a and 54b.

For example, the first support member 51 may be provided in the vicinity of the first longer side, and the fourth support member 54 may be provided in the vicinity of the second longer side. In addition, the second support member 52 may be provided in the vicinity of the first short side, and the third support member 53 may be provided in the vicinity of the second shorter side.

For example, the first support member 51 may include synthetic resin. For example, the second, third, and fourth support members 52, 53, and 54 may include metallic material.

The first and fourth support members 51 and 54 are coupled with the first and second longer sides of the bottom cover 10, and the second and third support members 52 and 53 are coupled with the first and second shorter sides of the bottom cover 10.

As shown in FIG. 2, the support member 50 enables the reflective sheet 20, the light guide plate 30, and the optical sheet 40 to be coupled with the bottom cover 10 while contacting to the bottom cover 10, and supports the display panel 60.

Referring to FIGS. 2, 7, 8, and 11, the first support member 51 includes a first part 51a provided above the bottom cover 10, the light emitting module 80, and the optical sheet 40 and the second part 51b perpendicularly bent from the first part 51a and provided on an outer portion of the bottom cover 10.

The first part 51a is provided therein with a recessed path 51c allowing a flexible printed circuit board 61 of the display panel 60 to extend out of the bottom cover 10, and provided therein with first coupling holes 51d such that the first part 51a may be coupled with the bottom cover 10 by a coupling member such as a screw, or may be coupled with the bottom cover 10 and the top cover 70 by a coupling member such as a screw. In addition, the second part 51b may be provided therein with chip arrangement holes 51e used for the arrangement of chips 63 coupled to the printed circuit board 62 of the display panel 60 and provided therein with coupling holes 51f such that the second part 51b may be coupled with the bottom and top covers 10 and 70 by a coupling member such as a screw.

The second support member 52 includes first part 52a allowing the reflective sheet 20, the light guide plate 30, and the optical sheet 40 to contact to the bottom cover 10 while supporting the display panel 60, a second part 52b protruding upward from the first part 52a to prevent the movement of the display panel 60, and third and fourth parts 52c and 52e protruding downward from the first part 52a, alternately aligned with each other while being spaced apart from each other, and coupled with inner and outer portions of the sidewall of the bottom cover 10, respectively. The second support member 52 is press-fitted with the sidewall of the bottom cover 10 by using the third and fourth parts 52c and 52e. The third part 52c is formed thereon with a coupling protrusion 52d, and the coupling protrusion 52d is inserted into the second support member coupling hole 10c formed in the bottom cover 10 so that the third part 52c is hooked with the bottom cover 10. The fourth part 52e may have a chip arrangement recess 52f provided therein with a space in which a chip (not shown) of a second flexible printed circuit board 64 of the display panel 60 is arranged. An insulating tape or an insulating coating layer may be provided on a part of the first part 52a making contact with the second flexible printed circuit board 64.

The third support member 53 may have a structure the same as that of the second support member 52, and the details thereof will be omitted. In addition, the fourth support member 54 may have a structure the same as or similar to the structures of the second and third support members 52 and 53, and the detail thereof will be omitted.

Since the fourth support member 54 is provided in the vicinity of the second longer side, the fourth support member 54 may have a long length. In this case, the fourth support member 54 may be bent or damaged. Accordingly, the fourth support member 54 is divided into two parts, so that the fourth support member 54 may be more firmly coupled with the bottom cover 10. In contrast, since the first support member 51 has an area greater than that of the fourth support member 54, the first support member 51 may be less bent or damaged. In addition, when the first support member 51 includes synthetic resin, the first support member 51 may be stronger. Accordingly, the first support member 51 may be not divided into two parts.

FIGS. 12 to 15 are views showing the structure capable of preventing the movement of the reflective sheet 20, the light guide plate 30, and the optical sheet 40 in the display device according to the embodiment.

Figure 12:
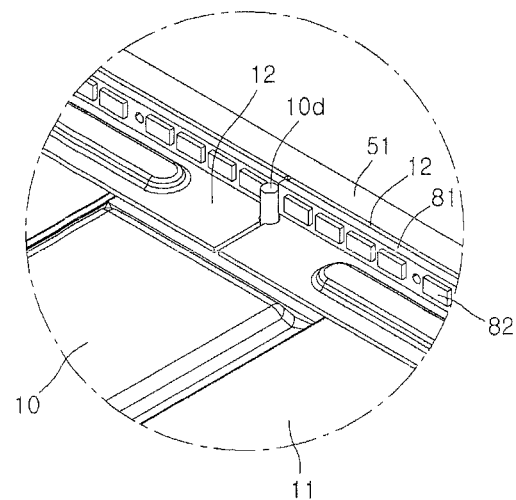
FIGS. 12 to 15 are views showing the structure of preventing the movement of a reflective sheet, a light guide plate, and an optical sheet in the display device according to the embodiment.
Figure 13:
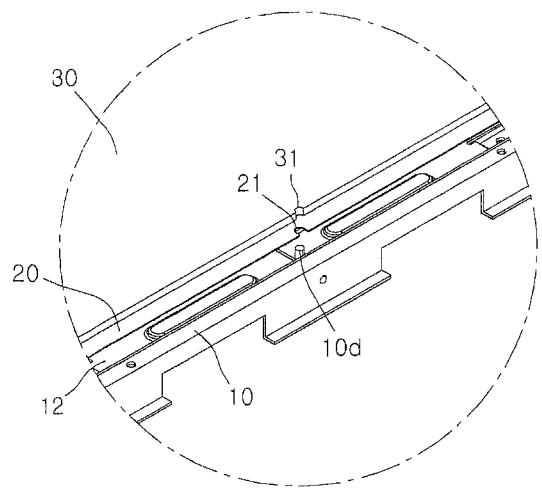

Referring to FIGS. 12 and 13, a first boss 10d is formed in the vicinity of the first longer side of the bottom cover 10 to prevent the reflective sheet 20, the light guide plate 30, and the optical sheet 40 from being moved, and space the reflective sheet 20, the light guide plate 30, and the optical sheet 40 apart from the light emitting device 82 at a predetermined interval.

The reflective sheet 20 is provided therein with a first boss insertion recess 21 corresponding to the first boss 10d, and the light guide plate 30 is provided therein with a first boss insertion recess 31 corresponding to the first boss 10d.

The first boss insertion recesses 21 and 31 of the reflective sheet 20 and the light guide plate 30 are coupled with the first boss 10d, thereby preventing the reflective sheet 20 and the light guide plate 30 from being moved.

Although not shown in detail, the optical sheet 40 may be provided therein with a first boss insertion recess corresponding to the first boss 10d.

Figure 14:
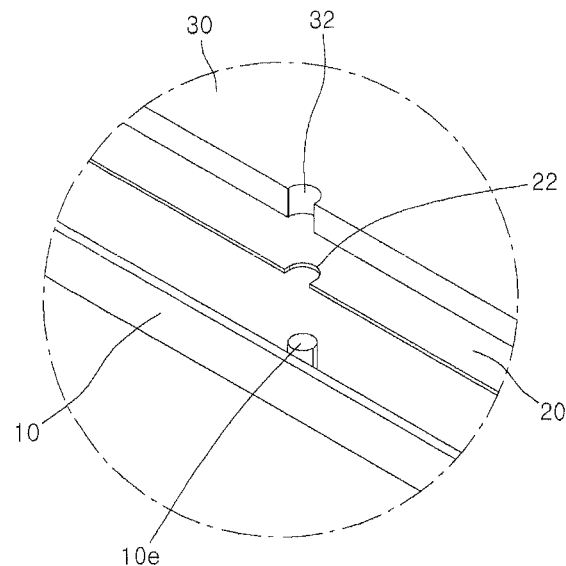

Referring to FIG. 14, a second boss 10e is formed in the vicinity of the second shorter sides of the bottom cover 10 to prevent the reflective sheet 20, the light guide plate 30, and the optical sheet 40 from being moved.

The reflective sheet 20 is provided therein with a second boss insertion recess 22 corresponding to the second boss 10e, and the light guide plate 30 is provided therein with a second boss insertion recess 32 corresponding to the second boss 10d.

The second boss insertion recesses 22 and 32 of the reflective sheet 20 and the light guide plate 30 are coupled with the second boss 10e to prevent the reflective sheet 20 and the light guide plate 30 from being moved.

Although not shown in detail, the optical sheet 40 may be provided therein with a second boss insertion recess corresponding to the second boss 10e.

The second boss 10e may be formed in the vicinity of both or only one of the second and third shorter sides of the bottom cover 10.

Figure 15:
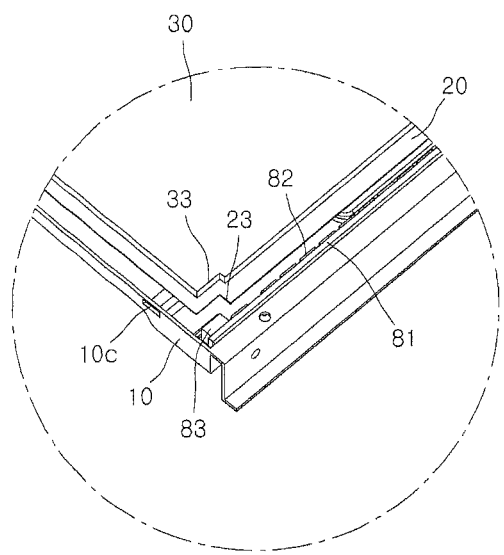

Referring to FIG. 15, the reflective sheet 20 is provided therein with a connector insertion recess 23 corresponding to the connector 83, and the light guide plate 30 is provided therein with a connector insertion recess 33 corresponding to the connector 83.

The connector 83 electrically connects the light emitting module 81 including the light emitting device 82 to the power supply or the printed circuit board installed at the rear surface of the bottom cover 10. The connector 83 makes contact with connector insertion recesses 23 and 33 to support the reflective sheet 20 and the light guide plate 30, so that the reflective sheet 20 and the light guide plate 30 are spaced apart from the light emitting device 82 at a predetermined interval.

Although not shown in detail, the optical sheet 40 may be formed therein a connector insertion recess corresponding to the connector 83.

Figure 16:
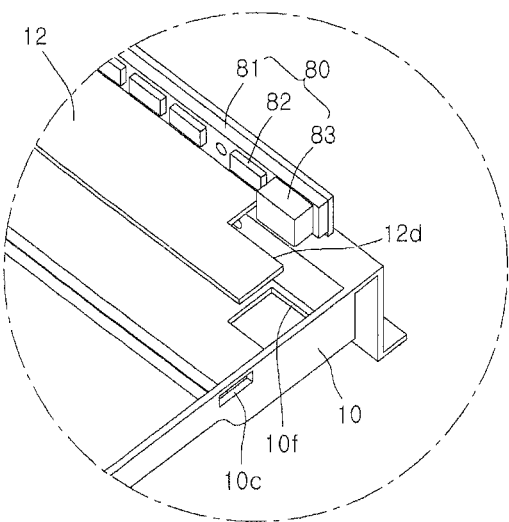
FIGS. 16 and 17 are views showing the structure of the display device according to the embodiment in which the connector is electrically connected to a power supply or a printed circuit board provided at a rear surface of the bottom cover.
Figure 17:
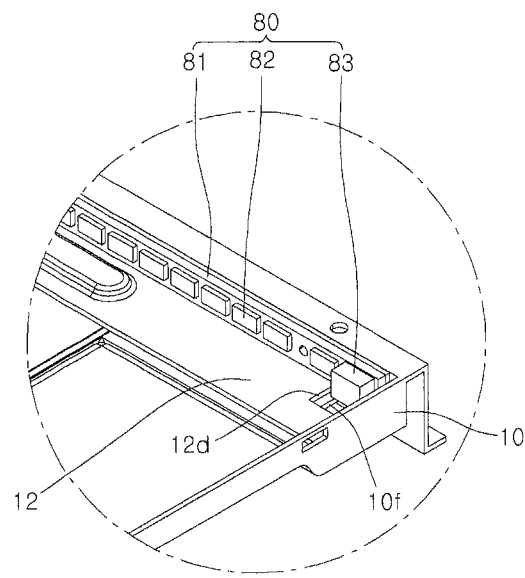

FIGS. 16 and 17 are views showing the structure of the display device according to the embodiment in which the connector 83 is electrically connected to the power supply or the printed circuit board provided at the rear surface of the bottom cover 10.

Referring to FIGS. 16 and 17, a cable withdrawal hole 10f is formed at the corner part of the bottom cover 10, that is, at the meeting part of the first longer side and the first shorter side of the bottom cover 10. A cable withdrawal recess 12d is formed at the end of the second heat dissipation member 12 installed on the bottom cover 10 corresponding to the cable withdrawal hole 10f. The cable withdrawal hole 10f is formed in the bottom surface of the bottom cover 10 and connects the front surface of the bottom cover 10 with the rear surface of the bottom cover 10.

Since the cable withdrawal hole 10f and the cable withdrawal recess 12d are formed in opposition to the connector 83, a cable (not shown) linked with the connector 83 can pass through the bottom cover 10 on the shortest path, so that the connector 83 can be easily connected to the power supply or the printed circuit board installed at the rear surface of the bottom cover 10.

The cable withdrawal hole 10f and the cable withdrawal recess 12d may be formed at the meeting part of the first longer side and the second shorter side.

Figure 18:
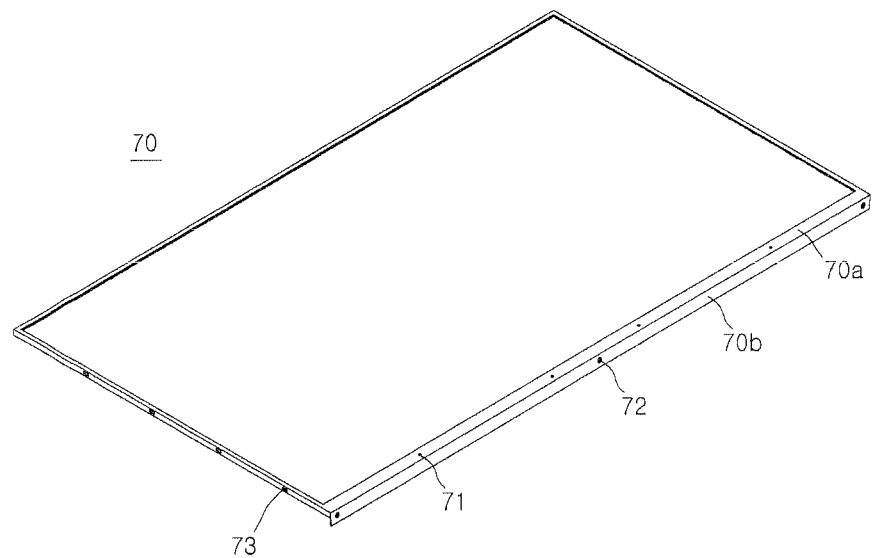
FIGS. 18 and 19 are views showing a top cover of the display device according to the embodiment.
Figure 19:
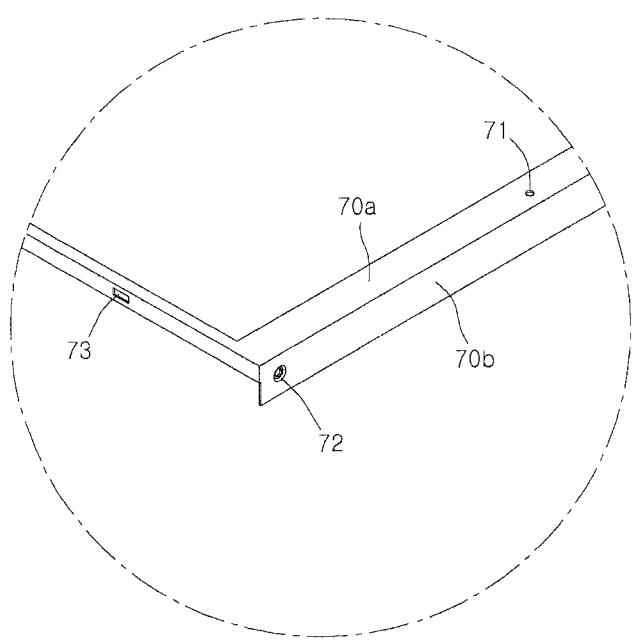

FIGS. 18 and 19 are views showing the top cover 70 of the display device according to the embodiment.

Referring to FIGS. 18 and 19, the top cover 70 includes a first part 70a provided at a front surface of the display device and a second part 70b bent in a perpendicular direction from the first part 70a and provided at a lateral surface of the display device.

A coupling hole 71 is formed in the first longer side of the first part 70a such that the top cover 70 can be coupled with the bottom cover 10 and the first support member 51 by a coupling member such as a screw.

A coupling hole 72 is formed at the first longer side of the second part 70b such that the top cover 70 can be coupled with the bottom cover 10 and the first support member 70 by a coupling member such as a screw. Coupling holes 73 are formed at the second longer side, the first shorter side, and the second shorter side of the second part 70b such that the coupling holes 73 can be hooked with the coupling protrusions 10g of the bottom cover 10.

The top cover 70 may be formed in a rectangular frame including the first and second longer sides and the first and second shorter sides.

According to the display device of the embodiment, the top cover 70 is coupled with the bottom cover 10 by a coupling member such as a screw at the first longer side thereof, and hooked with the bottom cover 10 at the second longer side and the first and second shorter sides thereof.

The top cover 70 is hooked with a lateral surface of the bottom cover 10, and screwed with the front and lateral surfaces of the bottom cover 10. Screws are inserted into the front and lateral surfaces of the bottom cover 10 while being perpendicular to each other, so that the top cover 70 can be more firmly coupled with the bottom cover 10.

The hook coupling ensures the convenient and rapid assembling process, and the coupling process employing the coupling member can ensure that the components are strongly assembled.

The top cover 70 can make contact with the first flexible printed circuit board 61 and the second flexible printed circuit board 64 coupled with the display panel 60. In order to ensure an electrical insulating property, an insulating tape may be provided or an insulating coating layer may be provided at a part in which the top cover 70 makes contact with the first flexible printed circuit board 61 and the second flexible printed circuit board 64.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
   a bottom cover;
   a light emitting module including a plurality of light sources in the bottom cover;
   a light guide plate at one side of the light emitting module in the bottom cover; an optical sheet on the light guide plate;
   a support member coupled with the bottom cover, in which a part of the support member is placed on the optical sheet to make contact with a top surface of the optical sheet so that a bottom surface of the optical sheet contacts to the light guide plate; and
   a top cover provided on the support member and coupled with the bottom cover, wherein the light sources are interposed between the support member and the bottom cover, and wherein the top cover includes a first longer side screwed with the bottom cover, a second longer side opposite to the first longer side, and first and second shorter sides hooked with the bottom cover between the first and second longer sides.

2. The backlight unit of claim 1, wherein the light emitting module is provided at the first longer side.

3. The backlight unit of claim 1, wherein the top cover is hooked with a lateral surface of the bottom cover, and screwed with at least one of front and lateral surfaces of the bottom cover.

4. The backlight unit of claim 1, wherein the bottom cover is provided on a second longer side and first and second shorter sides thereof with a coupling protrusion, and the top cover is provided in the second longer side and the first and second shorter sides thereof with a coupling hole into which the coupling protrusion is inserted.

5. The backlight unit of claim 1, wherein the bottom cover is formed in a first longer side thereof with a coupling hole, and the top cover is formed in the first longer side thereof with a coupling hole corresponding to the coupling hole of the bottom cover.

6. The backlight unit of claim 1, further comprising a reflective sheet between the bottom cover and the light guide plate.

7. A backlight unit, comprising:
   a bottom cover;
   a light emitting module including a plurality of light sources in the bottom cover;
   a light guide plate at one side of the light emitting module in the bottom cover;
   an optical sheet on the light guide plate;
   a support member hooked or screwed with the bottom cover, in which a part of the support member is placed on the optical sheet to make contact with a top surface of the optical sheet so that a bottom surface of the optical sheet contacts to the light guide plate; and
   a top cover provided on the support member and coupled with the bottom cover, wherein the light sources are interposed between the support member and the bottom cover, and wherein the support member includes a first support member coupled with a first longer side of the bottom cover, a second support member coupled with a first shorter side of the bottom cover, a third support member coupled with a second shorter side of the bottom cover, and a fourth support member coupled with a second longer side of the bottom cover.

8. The backlight unit of claim 7, wherein the top cover is hooked and screwed with the bottom cover.

9. The backlight unit of claim 8, wherein the top cover includes a first longer side screwed with the bottom cover, a second longer side opposite to the first longer side, and first and second shorter sides hooked with the bottom cover between the first and second longer sides.

10. The backlight unit of claim 7, wherein the first support member includes synthetic resin, and the second, third and fourth support members include metallic materials.

11. The backlight unit of claim 7, wherein the fourth support member is divided into two parts.

12. The backlight unit of claim 7, further comprising a reflective sheet between the bottom cover and the light guide plate.

13. A backlight unit comprising:
    a bottom cover;
    a light emitting module including a plurality of light sources in the bottom cover;
    a light guide plate at one side of the light emitting module in the bottom cover;
    an optical sheet on the light guide plate;
    a support member press-fitted and screwed with the bottom cover, in which a part of the support member is placed on the optical sheet to make contact with a top surface of the optical sheet so that a bottom surface of the optical sheet contacts to the light guide plate; and
    a top cover provided on the support member and coupled with the bottom cover, wherein the light sources are interposed between the support member and the bottom cover, wherein at least a part of the support member is provided inside the bottom cover, and at least a part of the support member is provided outside the bottom cover so that the support member is press-fitted with a sidewall of the bottom cover.

14. The backlight unit of claim 13, wherein the top cover is hooked and screwed with the bottom cover.

15. The backlight unit of claim 14, wherein the top cover includes a first longer side screwed with the bottom cover, a second longer side opposite to the first longer side, and first and second shorter sides hooked with the bottom cover between the first and second longer sides.

16. The backlight unit of claim 13, wherein the support member includes a first support member coupled with a first longer side of the bottom cover, a second support member coupled with a first shorter side of the bottom cover, a third support member coupled with a second shorter side of the bottom cover, and a fourth support member coupled with a second longer side of the bottom cover.

17. The backlight unit of claim 16, wherein the first support member includes synthetic resin, and the second, third and fourth support members include metallic materials.

\* \* \* \* \*